United States Patent

[11] 3,552,527

| [72] | Inventor | Edward J. Hayes |
| | | Livonia, Mich. |
| [21] | Appl. No. | 772,244 |
| [22] | Filed | Oct. 31, 1968 |
| [45] | Patented | Jan. 5, 1971 |
| [73] | Assignee | Kelsey-Hays Company |
| | | a corporation of Delaware |

[54] DISK BRAKE CALIPER AND MOUNTING STRUCTURE
8 Claims, 6 Drawing Figs.

[52] U.S. Cl. ................................................. 188/73.3
[51] Int. Cl. ........................................... F16d 65/02
[50] Field of Search ................................... 188/73, 73CL

[56] References Cited
UNITED STATES PATENTS

| 3,035,664 | 5/1962 | Desvignes et al. | 188/73 |
| 3,375,906 | 4/1968 | Hayes | 188/73 |
| 3,414,090 | 12/1968 | Hambling | 188/73(CL) |
| 3,184,005 | 5/1965 | Thirion | 188/73 |
| 3,480,116 | 11/1969 | Rath | 188/73.3 |

*Primary Examiner*—George E. A. Halvosa
*Attorney*—Harness, Dickey & Pierce

ABSTRACT: A sliding caliper-type disc brake embodying a torque plate having a pair of integral flanges that directly take the torque from one of the brake pads. The torque from the other brake pad is transmitted to the caliper and is taken from the caliper by a second pair of integral flanges of the torque plate. In addition, a flexible strap is connected to the caliper for positioning the caliper relative to the associated disc.

INVENTOR.
Edward J. Hayes

PATENTED JAN 5 1971

INVENTOR.
Edward J. Hayes.
BY
Harness, Dickey & Pierce
ATTORNEYS.

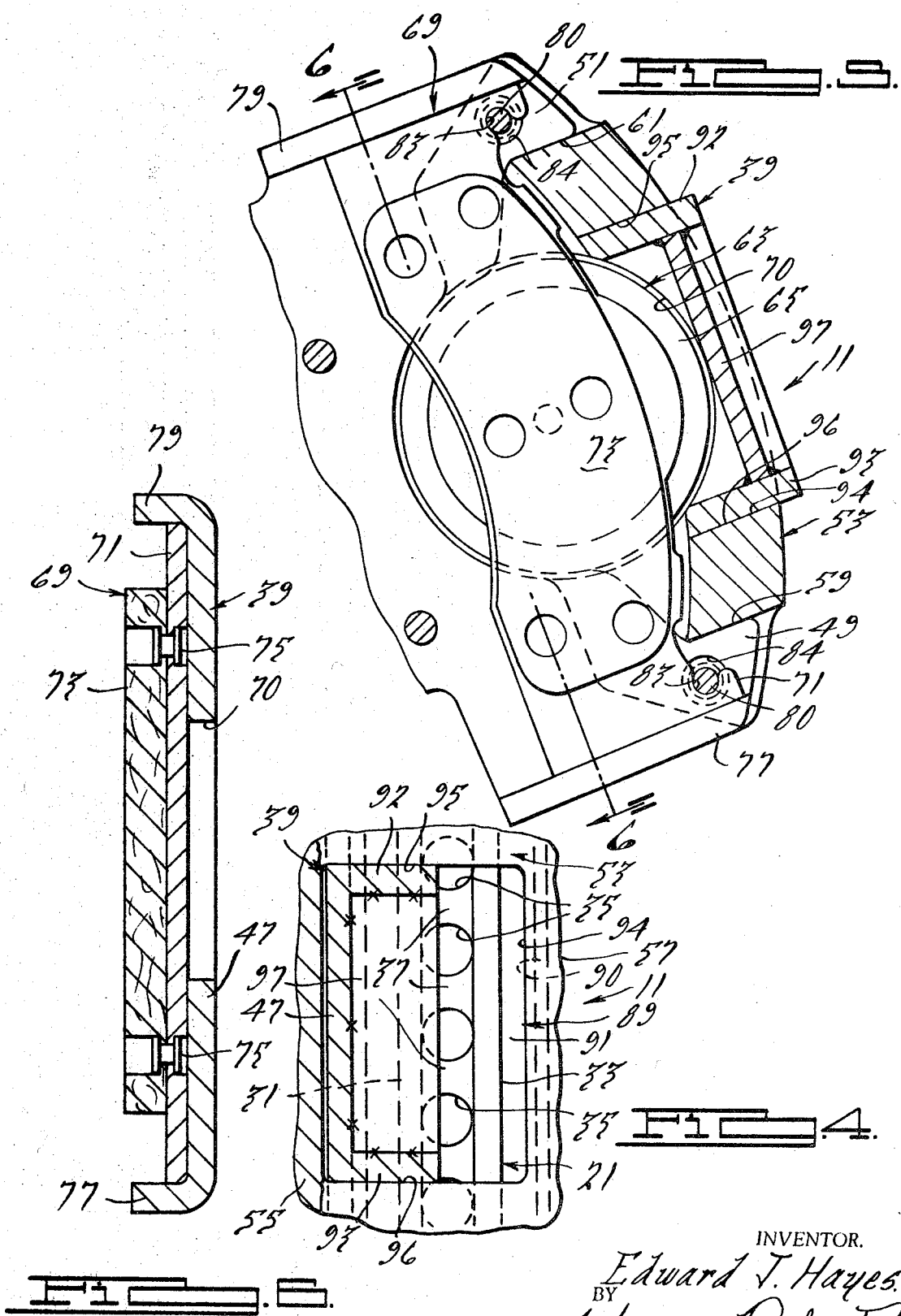

3,552,527

DISK BRAKE CALIPER AND MOUNTING STRUCTURE

BACKGROUND OF THE INVENTION

This invention relates to a disc brake assembly and more particularly to an improved arrangement for taking the torque in a disc brake.

This application is related to U.S. Pat. No. 3,352,382, entitled "Caliper-Type Disc Brake with Yieldable Support," issued Nov. 14, 1967 in the name of Edward J. Hayes and Talivaldis Sturis. In the brake assembly shown in that patent, a torque plate is provided which takes the torque from one of the brake pads. The torque from the other brake pad is transmitted to the caliper and is transmitted by the caliper to the torque plate and to a yieldable flexible strap which serves the additional purpose of positioning the caliper relative to the associated disc. Due to the transmission of the torque from one of the brake pads to the caliper, a twisting couple is exerted upon the caliper that tends to rotate it about an axis that extends perpendicular to the axis of rotation of the associated disc. Unless the effect of this torque couple is resisted, uneven lining wear will result.

It is, therefore, a principal object of this invention to provide an improved method for taking the torque in a disc brake of the type described.

It is another object of this invention to provide a disc brake assembly embodying an improved torque plate for taking torque both from one of the brake pads and from the caliper.

SUMMARY OF THE INVENTION

A disc brake assembly embodying this invention is particularly adapted for association with a disc supported for rotation about an axis and having oppositely facing braking surfaces. The brake assembly includes a caliper having first and second leg portions adapted to be disposed on opposite sides of the disc and adjacent respective of the disc-braking surfaces. The caliper has an intermediate portion extending between its legs and adapted to extend across the outer periphery of the disc. The intermediate portion of the caliper defines an opening that is adapted to be positioned adjacent the outer periphery of the disc and which opening is defined at least in part by facing shoulders of the intermediate portion. The shoulders are adapted to extend substantially parallel to the axis of rotation of the disc. First and second brake pads are associated with each of the caliper legs and are adapted to be juxtaposed to respective of the disc-braking surfaces. Actuating means are provided for moving the brake pads into frictional engagement with the respective disc-braking surfaces. A torque plate adapted to be fixed relative to the disc in a position between the first leg of the caliper assembly and the associated braking surface of the disc has a pair of flanges that extend at least in part across the outer periphery of the disc toward the second leg of the caliper. The flanges are engaged by the shoulders of the caliper intermediate portion for holding the caliper against rotation relative to the axis of rotation of the disc The flanges are circumferentially spaced from each other and with the opening in the caliper intermediate portion provided a substantially unrestricted path of cooling air flow radially outwardly from the disc.

BRIEF DESCRIPTION OF THE DRAWINGS

FIG. 4 is a cross-sectional view taken along the line 4-4 of FIG. 2.

FIG. 5 is a cross-sectional view taken along the line 5-5 of FIG. 2.

FIG. 6 is a cross-sectional view taken along the line 6-6 of FIG. 5.

DETAILED DESCRIPTION OF THE PREFERRED EMBODIMENT

Figure 1:
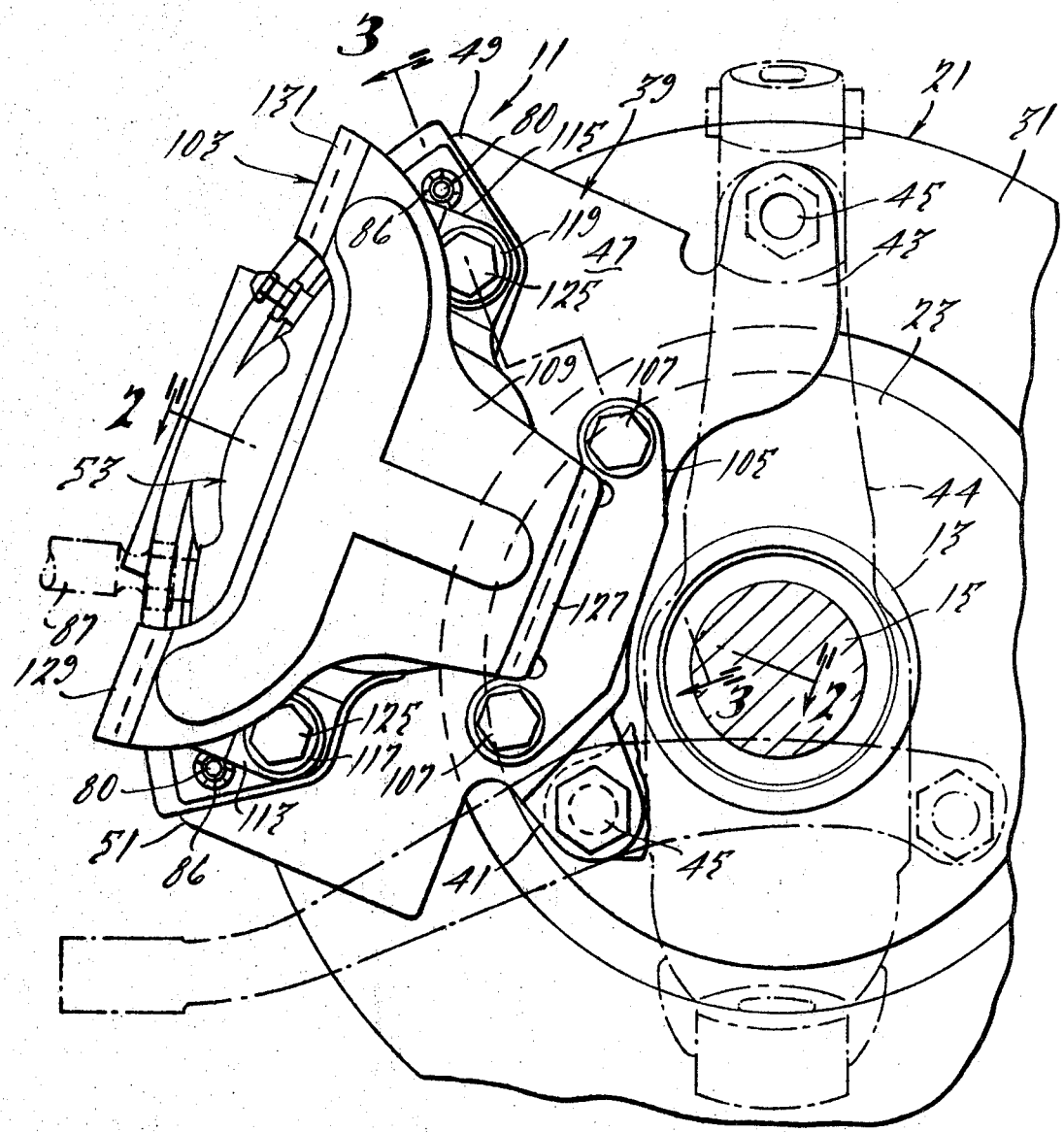
FIG. 1 is a side elevational view of a disc brake assembly embodying this invention.

A disc brake embodying this invention is illustrated generally at 11 and is shown associated with a vehicle wheel assembly (FIGS. 1 and 2) having a hub 13 rotatably supported on a stationary wheel spindle 15 by bearings 17, 19 and to which a conventional wheel rim (not shown) is adapted to be secured. A brake disc or rotor 21 is provided with an attaching flange 23 secured to a flange 25 on the hub 13 by bolts 27 and nuts 29 and has a pair of oppositely disposed radially extending braking surfaces 31 and 33. A plurality of radially extending openings 35 in the disc 21 are spaced apart by webs 37 which serve as fan blades to move cooling air outwardly through the openings 35 during turning movement of the disc 21.

A torque plate or spider, indicated generally by the reference number 39, has a pair of flangelike projections 41, 43 adapted to be fixed by screws 45 to a steering knuckle assembly 44 nonrotatably supported by the wheel spindle 15 through a conventional king pin arrangement (not shown) when the disc brake is associated with a vehicle front wheel. In the rear-wheel version, the torque plate 39 may have flange means secured directly to a flange integral with the stationary wheel spindle 15. The torque plate 39 has a web 47 offset from the projections 41 and 43 and provided with a pair of spaced, outwardly extending torque arms 49 and 51 (FIG. 5) integral therewith.

A generally C-shaped housing or caliper 53 is provided with generally opposed legs 55 and 57 lying on opposite sides of the disc 21 and which legs are disposed in spaced confronting relation to the disc-braking surfaces 31 and 33. The caliper is snugly but slidably received between opposed torque reaction faces 59 and 61 formed on the torque arms 49 and 51, respectively (FIG. 5). A hydraulic motor 63 is carried by the caliper leg 55 and is seen to include a piston 65 slidably disposed in a cylinder bore 67 formed in the leg 55. A flexible boot 68 is fixed at its ends to the caliper leg 55 and the piston 65 to prevent contamination of the sliding piston and cylinder bore surfaces. The torque plate 39 is formed with an opening 70 through which the outer end of the piston passes.

Figure 2:
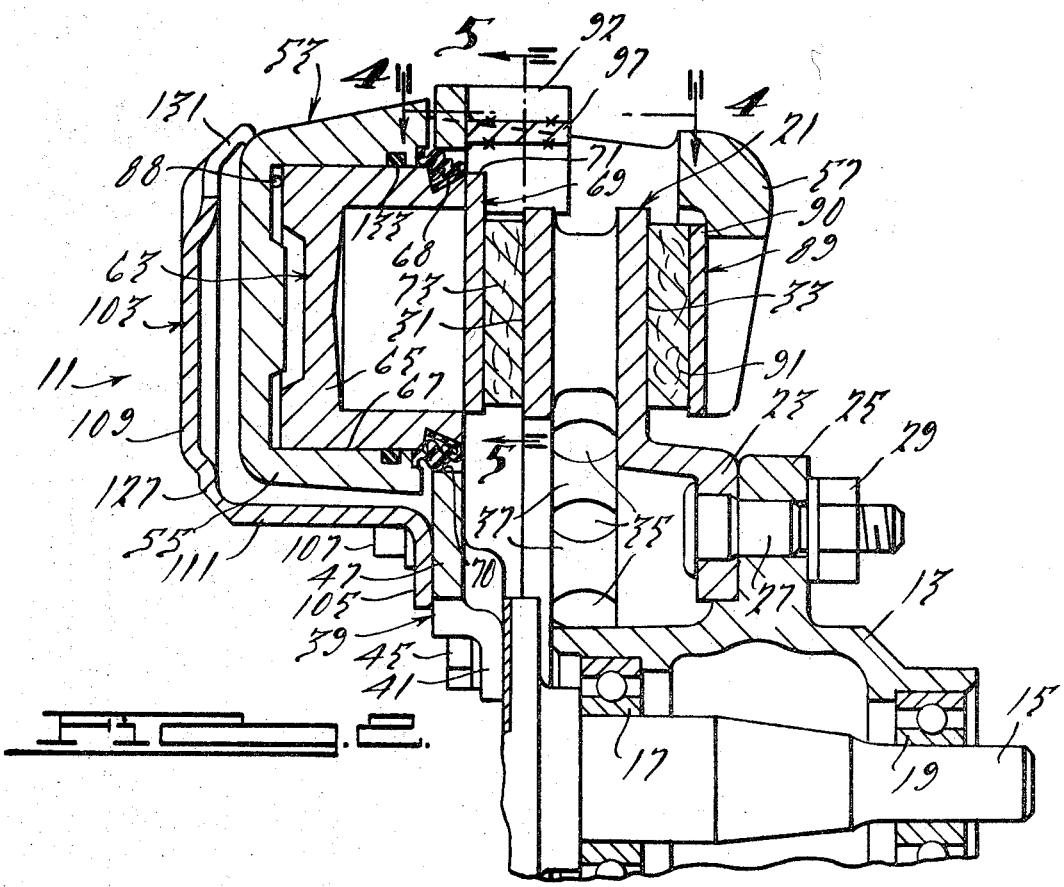
FIG. 2 is a cross-sectional view taken along the line 2-2 of FIG. 1.

The outer end of the piston 65 is positioned to engage a brake pad 69 including a backing plate 71 having brake lining 73 secured thereto by bonding or rivets 75 so that when the piston 65 moves toward the right, as seen in FIG. 2, the brake lining 73 is pressed into frictional engagement with the disc-braking surface 31. The brake pad 69 is prevented from turning with the disc 21 by a laterally spaced pair of right-angle flanges 77 and 79 formed integrally with the torque plate 39 between which the brakeshoe backing plate 71 is confined (FIGS. 5 and 6). Each of a spaced pair of pins 80 extends through aligned openings 81, 82 at opposite sides of the caliper 53. Each of the pins 80 is received in recesses 83 in the backing plate 71 and extends through openings 84 in the torque arms 49 and 51 aligned with the openings 81 and 82 to position the brake pad 69 during assembly. Each pin 80 has an enlarged head 85 at one end and has a spring washer 86 pressed on its other end to hold the pins 80 against longitudinal movement relative to the caliper 53.

The hydraulic piston 65 is moved toward the right, as seen in FIG. 2, by admitting pressurized fluid to the cylinder bore 67 behind the piston 65 through a conduit 87 connected to a passage 88 in the caliper leg 55. This fluid pressure biases the caliper 53 toward the left as seen in the figure and through the caliper leg 57, which is the reaction portion of the brake, presses a second brake pad 89 toward the disc 21. The brake pad 89 includes a backing plate 90 seated against a flat surface on the caliper leg 57 and having brake lining 91 secured thereto by bonding in the usual manner or by rivets. The caliper leg 57 is centrally apertured (FIG. 2) to reduce the overall weight of the device and has a pair of slots (not shown) one at either side thereof, to snugly receive right-angle flanges (not shown) on either end of the backing plate 90. Thus, when the caliper 53 and the brake pad 89 are biased toward the left, as seen in FIG. 2, the brake lining 91 is pressed into frictional engagement with the disc-braking surface 33 and acts conjointly with the lining 73 of the brake pad 69 to slow or stop the vehicle wheel.

As set forth hereinabove, it is necessary that the motivating forces pressing brake linings 73 and 91 of pads 69 and 89 into frictional engagement with the disc-braking surfaces 31 and 33 act perpendicular to the surfaces 31 and 33 or as near as possible thereto to insure the desirable brake-lining wear pattern. As has been noted, the brake pad 69 and more particularly its backing plate 71 is engaged with the flanges 77 and 79 of the torque plate 39. Rotation of the brake pad 39 with the disc 24 upon frictional engagement with the disc-braking surface 31 will be precluded by this engagement with the torque plate 39. Said another way, the frictional braking torque exerted upon the first brake pad 69 is transmitted directly to the torque plate 39.

The brake pad 89 transfers its braking torque to the caliper leg 57. Hence, a force is exerted upon the caliper 53 which tends to cause the caliper 53 to rotate with the disc 21. This torque is resisted by a pair of flanges 92 and 93 formed integrally at the outer end of the torque plate 39. The flanges 92 and 93 extend into an opening or throat 94 formed by an intermediate portion of the caliper 53 which intermediate portion connects the caliper leg 55 with the caliper leg 57. The throat or opening 94 is defined in part by shoulders 95 and 96 of this intermediate portion which shoulders are slidingly engaged with the torque plate flanges 92 and 93. The flanges 92 and 93 extend perpendicularly to the axis of rotation of the disc 21 and overlie at least in part the disc 21. In order to provide reinforcing in the area where the shoulders 95 and 96 engage the flanges 92 and 93, a plate 97 is welded to the inner surfaces of the flanges 92 and 93 and extends in a generally chordal direction with respect to the disc 21. Engagement of the surface 95 and 96 with the flanges 92 and 93 takes place over a substantial area in planes that extend parallel to the axis of rotation of the disc 21. Due to this substantial contact area, the torque couple which tends to cause the caliper 53 to rotate about an axis disposed perpendicularly to the axis of rotation of the disc 21, will be absorbed and uneven wear of the lining 91 of the brake pad 89 will be resisted.

It has been noted that the webs 37 of the disc 21 serve as fan blades to move cooling air outwardly through the openings 35 during rotation of the disc 21. The use of the spaced flanges 92 and 93 in connection with the throat or opening 94 does not substantially restrict this cooling airflow. This is true even though the plate 97 extends between the flanges 92 and 93. As will be noted from FIG. 2, the elements are so positioned as to provide a substantially unrestricted airflow path radially outwardly of the disc 21.

Figure 3:
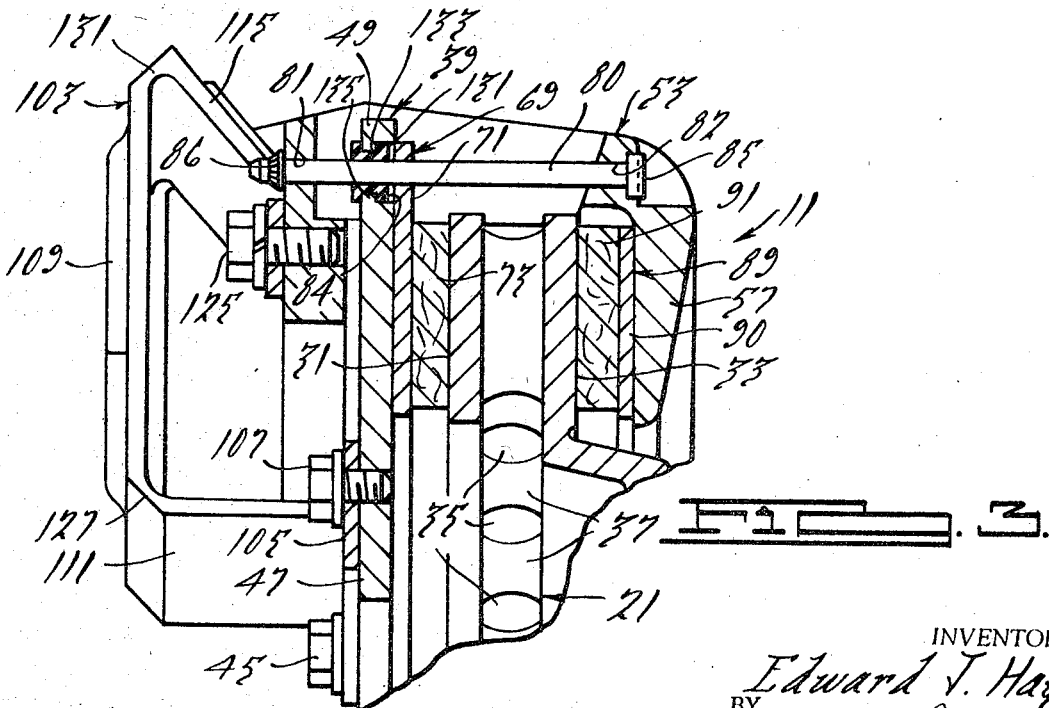
FIG. 3 is a cross-sectional view taken along the line 3-3 of FIG. 1.

A flexible strap 103 positions the caliper 53 relative to the disc 21. As shown in FIGS. 1—3, the strap 103 has an inner, radial flange 105 fixed to the torque plate web 47 by screws 107. A laterally offset arm 109 has one end interconnected with the flange 105 by a web 111 and is disposed in spaced confronting relation to the caliper leg 55. A pair of reversely bent spring fingers 113 and 115 taper inwardly from the arm 109 at its other end and each forms an acute angle therewith. The fingers 113 and 115 have angled terminal ends 117 and 119 which bear flat against seats on the caliper 53 and are fixed thereto by screws 125. The strap 103 has reduced thickness areas 127 and 129, 131 between the web 111 and arm 109, and between the arm 109 and fingers 113, 115, respectively, forming a pair of parallel-spaced, solid-state hinges or pivot axes about which the arm 109 can pivot relative to the web 111 and about which the fingers 113, 115 can pivot relative to the arm 109.

When the parts are assembled, the flexible strap 103 is stressed to act in a springlike manner to bias the caliper 53 toward the left, as seen in FIGS. 2 and 3 and causes the brake lining 91 of the shoe 89 to normally engage the disc-braking surface 33 with a light rubbing contact. When the hydraulic motor 63 is pressurized, the piston 65 moves toward the right, as seen in FIG. 2, and presses the lining 73 of the brake pad 69 into frictional engagement with the disc-braking surface 31. The reaction to motor pressurization biases the caliper 53 toward the left and increases the frictional engagement between the lining 91 of brake pad 89 and the braking surface 33. The only caliper movement occurring here is that necessary to increase the frictional contact between the lining 91 and the rotor face 33 and is quite small. When the fluid pressure to the motor 63 is released, the piston 65 backs off slightly to release the lining 73 of brake pad 69 from tight engagement with the braking surface 31 and the caliper 53 is released so that the lining 91 of brake pad 89 engages the braking surface 33 solely under the spring force of the flexible strap 103.

An annular seal 133 carried within the cylinder bore 67 sealingly engages the piston 65 and has a generally rectangular cross-sectional configuration so that when the piston 65 moves toward the right during brake application, the seal 133 is twisted or distorted. Thus, when the fluid pressure to the motor 65 is released, the seal 133 springs back slightly and releases the lining 73 of brake pad 69 from tight engagement with the braking surface 31.

As the brake lining 91 becomes worn, the spring-like flexible strap 103 automatically shifts the caliper 53 toward the left as seen in FIGS. 2 and 3 and keeps the lining 91 of brake pad 89 in contact with the surface 33, the contact force between the lining 91 and the surface 33 becoming progressively less as the caliper 53 moves in this direction. As the caliper 53 undergoes this movement, the strap arm 109 swings in a counterclockwise direction about the hinge area 127 while the fingers 113 and 115 swing in a counterclockwise direction about the hinge areas 129 and 131. The strap arm 109 and fingers 113 and 115 are preloaded by elastically bending them in a clockwise direction about these hinge areas so that they move under this elastic loading in a counterclockwise direction as the lining 91 wears. Because of the solid nature of these hinge areas 127 and 129 and since the strap 103 is fixed to the torque plate 39 and to the caliper 53, there are no sliding surfaces between these parts which can become contaminated or freeze up during use.

The spring-like pivotal force exerted on the fingers 113, 115 at the hinge areas 129 and 131 and the pivotal force exerted on the arm 109 at the hinge area 127 are such that as the caliper 53 moves with wear of the lining 91, the axis of the cylinder bore 67 remains perpendicular to the disc surfaces 31 and 33 and the surface 94 on the caliper leg 57 against which the backing plate 90 of brake pad 89 is seated remains parallel to these surfaces 31 and 33. In order to achieve this, the elastic spring force on the arm 109 which pivots the arm 109 about the hinge area 127 is slightly greater than the elastic spring force tending to pivot the fingers 113 and 115 about the hinge areas 129 and 131 because of the greater length of the arm 109 as compared with the fingers 113 and 115. This insures that the brake pad motivating forces always act normal to the surfaces 31 and 33. Of course, if the length of the arm 109 and the fingers 113 and 115 were equal or if the arm 109 was shorter than the fingers 113 and 115, the spring force on the arm 109 should be equal to or less than the spring force on the fingers 113 and 115, accordingly.

Thus, as the lining 91 gradually becomes worn, the caliper 53 shifts toward the left as seen in FIG. 2 and keeps the lining 91 always in engagement with the surface 33. The lining 73 of brake pad 69 remains close to or lightly engaging the surface 31 and the piston 65 is not knocked back or toward the left within the cylinder bore 67 so that in this way the pressurization of the motor 63 and therefore pedal travel needed to energize the brakes is indeed small and remains relatively constant. In addition, the spring-like action of the strap 103 and the light contact between the linings 73, 91 and the braking surfaces 31 and 33 keeps these parts from vibrating and rattling. Significantly, because of the maintained orientation of the caliper 53 relative to the surfaces 31 and 33, the resulting wear pattern on both linings 73, 91 is good and the brake lining life is maximized. As has been noted, the contact between the torque plate flanges 92 and 93 and the caliper shoulders 95 and 96 holds the caliper 53 and the associated brake pad 89 in an accurate position relative to the disc 21. As the caliper 53 shifts during wear of the lining 91, the caliper moves slightly in a radial direction relative to the disc 21. However, this movement is insignificant both because it is a very small amount and because the radial dimension of the rotor faces 31, 33 is slightly greater than that of the linings 73, 91 to allow a small amount of relative radial movement therebetween.

A resilient grommet 131 is in snug, surrounding relation to each of the pins 80 and each grommet has an annular groove 133 in its outer surface receiving an annular flange 135 on the torque arms 49, 51 adjacent the openings 84 (FIG. 3). The grommets 131 normally frictionally hold the pins 80 against axial movement relative to the torque plate 47 and overcome, for example, centrifugal forces tending to move the caliper 53 in a direction normal to the disc-braking surfaces 31 and 33 when the vehicle wheel (not shown) is turned during cornering. This prevents the caliper 53 from bearing inboard or toward the left as seen in FIG. 2 which would cause undesirable frictional engagement between the lining 91 and the surface 33 and premature wear of this lining and excessive rotor heating. In addition, the grommets 131 afford an additional cushioned support for the caliper 53 maintaining its orientation relative to the rotor 21 against sharp blows as when the vehicle wheel (not shown) hits a bump and provides a rattle-free construction for these parts.

Furthermore, and perhaps most importantly, the caliper 53 is prevented from moving outboard or toward the right as seen in FIG. 2 under centrifugal forces acting thereon in this direction. Were this caliper movement not prevented, greater piston travel and correspondingly greater pedal travel would be necessary to effect braking on the disc 21. The frictional gripping forces exerted by the grommets 131 on the pins 80 are overcome by the spring-like force exerted by the flexible strap 103 on the caliper 53 so that the lining 91 of brakeshoe 89 is always seated lightly against the rotor surface 33.

I claim:

1. A disc brake assembly for association with a disc supported for rotation about an axis and having oppositely facing braking surfaces comprising a caliper assembly having first and second leg portions adapted to be disposed on opposite sides of the disc and adjacent respective of the disc-braking surfaces, said caliper having an intermediate portion extending between said legs and adapted to extend across the outer periphery of the disc, said intermediate portion defining an opening adapted to be positioned adjacent the outer periphery of the disc, said opening being defined at least in part by facing shoulders of said intermediate portion, said shoulders being adapted to extend substantially parallel to the axis of rotation of the disc, first and second brake pads associated with said first and second leg portions, respectively, and adapted to be associated with respective of the disc-braking surfaces, actuating means carried by said caliper for forcing said brake pads into frictional engagement with the respective braking surfaces of the disc, and a torque plate adapted to be fixed relative to the disc and being interposed between said first leg of said caliper assembly and the associated braking surface of the disc, said torque plate having a pair of circumferentially spaced flanges extending toward said second leg of said caliper assembly and at least in part across the outer periphery of the associated disc, said flanges providing axially extending surfaces engaged by said shoulders of said caliper intermediate portion for holding said caliper assembly against rotation relative to the axis of rotation of the disc, said spaced flanges and said opening providing a substantially unrestricted path of cooling airflow radially outwardly from the disc.

2. A disc brake assembly as set forth in claim 1 wherein the actuating means includes a hydraulically actuated piston slidably carried by the first leg of the caliper assembly, the torque plate having an opening formed to pass said piston.

3. A disc brake assembly as set forth in claim 1 wherein the flanges are formed integrally with the torque plate.

4. A disc brake assembly as set forth in claim 3 further including a reinforcing member affixed to the flanges and adapted to extend in a substantially chordal direction relative to the disc, said reinforcing members being spaced radially outwardly from the disc for precluding interference with the airflow therefrom.

5. A disc brake assembly as set forth in claim 1 wherein the disc brake assembly is of the sliding caliper type, and further including means for transmitting torque from the first brake pad directly to the torque plate and means for transmitting torque from the second brake pad directly to the caliper assembly.

6. A disc brake assembly as set forth in claim 5 wherein the means for transmitting the torque from the first brake pad directly to the torque plate comprises a second pair of flanges formed integrally with said torque plate and abuttingly engaging said first brake pad, the first-mentioned pair of flanges being formed integrally with said torque plate.

7. A disc brake assembly as set forth in claim 6 wherein both pairs of flanges extend from the torque plate in the same direction toward the associated disc.

8. A disc brake assembly as set forth in claim 6 further including a reinforcing member extending between the first mentioned pair of flanges in a substantially chordal direction relative to the disc, said reinforcing member being affixed to said flanges in juxtaposition to the area of engagement of the caliper shoulders with said flanges, said reinforcing members being spaced radially outwardly from the disc for precluding interference with the airflow therefrom.